(12) United States Patent
Liu

(10) Patent No.: US 10,740,946 B2
(45) Date of Patent: Aug. 11, 2020

(54) PARTIAL IMAGE PROCESSING METHOD, DEVICE, AND COMPUTER STORAGE MEDIUM

(71) Applicant: NUBIA TECHNOLOGY CO., LTD., Shenzhen (CN)

(72) Inventor: Linwen Liu, Shenzhen (CN)

(73) Assignee: NUBIA TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/065,358

(22) PCT Filed: Dec. 7, 2016

(86) PCT No.: PCT/CN2016/108921
§ 371 (c)(1),
(2) Date: Jun. 22, 2018

(87) PCT Pub. No.: WO2017/107773
PCT Pub. Date: Jun. 29, 2017

(65) Prior Publication Data
US 2019/0005700 A1    Jan. 3, 2019

(30) Foreign Application Priority Data
Dec. 24, 2015 (CN) .......................... 2015 1 0990750

(51) Int. Cl.
*G06T 13/80* (2011.01)
*G06T 13/00* (2011.01)
(Continued)

(52) U.S. Cl.
CPC ................ *G06T 13/80* (2013.01); *G06T 7/13* (2017.01); *G06T 7/70* (2017.01); *G06T 13/00* (2013.01); *H04N 5/2625* (2013.01); *H04N 5/272* (2013.01)

(58) Field of Classification Search
CPC .......... G09G 5/393; G09G 5/10; G09G 5/395; G09G 2310/04; G09G 2320/0626;
(Continued)

(56) References Cited

U.S. PATENT DOCUMENTS 8,957,915 B1 * 2/2015 Chalasani .............. G09G 5/377
345/473
2005/0281482 A1 * 12/2005 Nishiyama ........... H04N 1/6011
382/282
(Continued)

FOREIGN PATENT DOCUMENTS

CN    101051389 A    10/2007
CN    101673403 A    3/2010
(Continued)

OTHER PUBLICATIONS

Zhou, Microbial contour extraction based on edge detection, IEEE, 2009 (Year: 2009).*
(Continued)

*Primary Examiner* — Phuc N Doan
(74) *Attorney, Agent, or Firm* — Anova Law Group, PLLC

(57) ABSTRACT

Embodiments of the present disclosure disclose a partial image processing method, the method includes: obtaining a multi-frame picture that make up a first dynamic picture; receiving a user input operation on a specified frame picture in the multi-frame picture, and determining a delineated area based on the input operation; according to the multi-frame picture, determining a movable object of the delineated area; determining a partial area where the movable object in the multi-frame picture is located; and according to the partial area of the multi-frame picture, generating and displaying a
(Continued)

second dynamic picture. Embodiments of the present disclosure also disclose a partial image processing device and computer storage medium.

16 Claims, 7 Drawing Sheets

(51) Int. Cl.
  *H04N 5/272* (2006.01)
  *H04N 5/262* (2006.01)
  *G06T 7/13* (2017.01)
  *G06T 7/70* (2017.01)
(58) Field of Classification Search
  CPC ....... G09G 2320/103; G09G 2330/021; G09G 2340/0407; G09G 2340/0492; G09G 2340/16; G09G 2350/00; G09G 2360/127
  See application file for complete search history.

(56) References Cited

U.S. PATENT DOCUMENTS

| | | | |
|---|---|---|---|
| 2007/0115366 A1 | 5/2007 | Tsubaki | |
| 2008/0100709 A1* | 5/2008 | Furukawa | G01S 3/7865 348/169 |
| 2008/0170751 A1* | 7/2008 | Lei | G06T 7/215 382/103 |
| 2008/0303913 A1* | 12/2008 | Mertens | H04N 5/232 348/222.1 |
| 2009/0297031 A1* | 12/2009 | Pettigrew | G06K 9/342 382/195 |
| 2011/0058748 A1* | 3/2011 | Trifonov | G06K 9/6209 382/199 |
| 2011/0199513 A1* | 8/2011 | Ogawa | G06K 9/00711 348/231.99 |
| 2012/0206597 A1* | 8/2012 | Komoto | G06K 9/00805 348/135 |
| 2014/0010409 A1* | 1/2014 | Yamashita | G06K 9/00342 382/103 |
| 2015/0146925 A1* | 5/2015 | Son | G06K 9/00624 382/103 |
| 2015/0371101 A1* | 12/2015 | Yamamoto | G06T 11/60 715/771 |

FOREIGN PATENT DOCUMENTS

| | | | |
|---|---|---|---|
| CN | 102074033 A | 5/2011 | |
| CN | 103971391 A | 8/2014 | |
| CN | 105469361 A | 4/2016 | |
| JP | 2013041332 | * 2/2013 | ........... G06F 3/0488 |

OTHER PUBLICATIONS

The World Intellectual Property Organization (WIPO) International Search Report for PCT/CN2016/108921 dated Feb. 22, 2017 7 Pages.

* cited by examiner

PARTIAL IMAGE PROCESSING METHOD, DEVICE, AND COMPUTER STORAGE MEDIUM

CROSS-REFERENCE TO RELATED APPLICATIONS

This application is a national phase entry under 35 U.S.C. § 371 of International Application No. PCT/CN2016/108921, filed on Dec. 7, 2016, which claims priority to and benefits of Chinese Patent Application Ser. No. 201510990750.2, filed with the State Intellectual Property Office of P.R. China on Dec. 24, 2015, the entire content of all of which is incorporated herein by reference.

FIELD OF THE DISCLOSURE

The present disclosure generally relates to image processing technology and, more particularly, relates to a partial image processing method, device, and computer storage medium.

BACKGROUND

The dynamic picture means that when a set of specific static images, such as geometry, are switched at the specified frequency, they will produce some kind of dynamic image effect. Existing dynamic picture can include: Flash dynamic picture, GIF (Graphics Interchange Format) dynamic picture and 3D dynamic picture.

GIF dynamic picture is the most widely used, in order to achieve the effect of animation, GIF dynamic picture makes multi-layer pictures to be switched differently based on the time. Its feature is that the picture is small, easy to place and call at any time. GIF is often used in conjunction with web decorations in music and picture works. Owing to GIF dynamic picture is the effect of switching of multi-layer pictures, the position or shape of a scene in the multi-layer pictures changes, then the trajectory or the movement form of the scene in the GIF dynamic picture will change. However, the existing technology cannot preserve the partial dynamic effect of the dynamic picture. For example, in a GIF dynamic picture, one person swings arms, but user only wants the selected right arms to show a swinging motion, and other display areas are static picture. Thus, it is not high operability to GIF for user, and reduce user experience.

BRIEF SUMMARY OF THE DISCLOSURE

In order to solve the above technical problems, embodiments of the present disclosure provide a partial image processing method, device, and computer storage medium., which can modify GIF dynamic picture according to user requirement, improve user operability to GIF dynamic picture, and enhance user experience.

The technical solution of embodiments of the present disclosure is implemented as follows:

According to a first aspect, embodiments of the present disclosure provide a partial image processing method, comprising:
  obtaining a multi-frame picture that make up a first dynamic picture;
  receiving a user input operation on a specified frame picture in the multi-frame picture, and determining a delineated area based on the input operation;
  according to the multi-frame picture, determining a movable object of the delineated area;
  determining a partial area where the movable object in the multi-frame picture is located; and
  according to the partial area of the multi-frame picture, generating and displaying a second dynamic picture.

As an implementation method, according to the multi-frame picture, determining a movable object of the delineated area further comprises:
  identifying multiple objects of the delineated area, and obtaining a first feature of the multiple objects;
  obtaining a second feature of the multiple objects in other frame pictures except the specified frame picture;
  matching the first feature and the second feature of any object in the multiple objects, and obtaining a matching first object;
  obtaining a location information of the first object in the multi-frame picture; and
  taking the first object with a different location information as the movable object.

As an implementation method, after obtaining a location information of the first object in the multi-frame picture further comprises:
  obtaining a total number of the first object with the different location information; and
  when the total number of the first object is greater than or equal to a predetermined multiple of picture frames that make up the first dynamic picture, taking the first object as the movable object.

As an implementation method, determining a partial area where the movable object in the multi-frame picture is located further comprises:
  in other frame pictures except the specified frame picture, obtaining other movable objects that have the same features as the movable object and are different location information from the movable object;
  obtaining an outline of the movable object and the other movable objects; and
  taking an area enclosed by the outline of the movable object and the other movable objects as the partial area of corresponding frame picture.

As an implementation method, before determining a movable object of the delineated area according to the multi-frame picture further comprises:
  obtaining each object of the delineated area; and
  when a second object in the delineated area is an incomplete image, complementing the second object from the specified frame picture.

As an implementation method, the delineated area is a closed area.

As an implementation method, receiving a user input operation on a specified frame picture in the multi-frame picture, and determining a delineated area based on the input operation further comprises:
  receiving the user input operation for the specified frame picture displayed on a touch screen, and according to the input operation, mapping an operation trajectory to the delineated area corresponding to the specified frame picture.

As an implementation method, matching the first feature and the second feature of any object in the multiple objects, and obtaining a matching first object further comprises:
  comparing the first feature of each object in the delineated area with the second feature of a corresponding object in the other frame pictures except the specified frame picture, obtaining a similarity parameter; and
  obtaining the object whose similarity parameter reach a preset threshold as the matching first object.

As an implementation method, obtaining an outline of the movable object and the other movable objects further comprises:

obtaining the outline of the movable object and the other movable objects through an edge detection method.

As an implementation method, according to the partial area of the multi-frame picture, generating and displaying a second dynamic picture further comprises:

according to the partial area of the multi-frame picture, generating the second dynamic picture that includes only the partial area, and displaying the second dynamic picture; or combining any frame picture with the partial area of each frame picture, generating the second dynamic picture that has a partial dynamic image, and displaying the second dynamic picture.

According to a second aspect, embodiments of the present disclosure provide a partial image processing device, comprising:

an acquisition unit is configured to obtain a multi-frame picture that make up a first dynamic picture;

a receiver unit is configured to receive a user input operation on a specified frame picture in the multi-frame picture, and determine a delineated area based on the input operation;

a determination unit is configured to, according to the multi-frame picture, determine a movable object of the delineated area, and determine a partial area where the movable object in the multi-frame picture is located; and a generation unit is configured to, according to the partial area of the multi-frame picture, generate and display a second dynamic picture.

As an implementation method, the determination unit is configured to:

identify multiple objects of the delineated area, and obtain a first feature of the multiple objects;

obtain a second feature of the multiple objects in other frame pictures except the specified frame picture;

match the first feature and the second feature of any object in the multiple objects, and obtain a matching first object;

obtain a location information of the first object in the multi-frame picture; and take the first object with a different location information as the movable object.

As an implementation method, the acquisition unit is configured to, after obtain a location information of the first object in the multi-frame picture, obtain a total number of the first object with the different location information;

the device includes:

a processing unit is configured to, when the total number of the first object is greater than or equal to a predetermined multiple of picture frames that make up the first dynamic picture, take the first object as the movable object.

As an implementation method, the acquisition unit is configured to:

in other frame pictures except the specified frame picture, obtain other movable objects that have the same features as the movable object and are different location information from the movable object;

obtain an outline of the movable object and the other movable objects; and take an area enclosed by the outline of the movable object and the other movable objects as the partial area of corresponding frame picture.

As an implementation method, the acquisition unit is configured to obtain each object of the delineated area; and the device includes:

a complement unit is configured to, when a second object in the delineated area is an incomplete image, complement the second object from the specified frame picture.

As an implementation method, the receiver unit is configured to receive the user input operation for the specified frame picture displayed on a touch screen, and according to the input operation, map an operation trajectory to the delineated area corresponding to the specified frame picture.

As an implementation method, the determination unit is configured to compare the first feature of each object in the delineated area with the second feature of a corresponding object in the other frame pictures except the specified frame picture, obtain a similarity parameter; and obtain the object whose similarity parameter reach a preset threshold as the matching first object.

As an implementation method, the determination unit is configured to obtain the outline of the movable object and the other movable objects through an edge detection method.

As an implementation method, the generation unit is configured to, according to the partial area of the multi-frame picture, generate the second dynamic picture that includes only the partial area, and display the second dynamic picture; or combine any frame picture with the partial area of each frame picture, generate the second dynamic picture that has a partial dynamic image, and display the second dynamic picture.

According to a third aspect, embodiments of the present disclosure provide a computer storage medium, wherein the computer storage medium stores computer executable instructions, the computer executable instructions are configured to perform the partial image processing method described in embodiments of the present disclosure.

Embodiments of the present disclosure provide a partial image processing method, device, and computer storage medium. First, obtaining a multi-frame picture that make up a first dynamic picture; receiving a user input operation on a specified frame picture in the multi-frame picture, and determining a delineated area based on the input operation; according to the multi-frame picture, determining a movable object of the delineated area; determining a partial area where the movable object in the multi-frame picture is located; then, according to the partial area of the multi-frame picture, generating and displaying a second dynamic picture. Thus, according to a delineated area of a specified frame picture, determining a movable object of the delineated area; and determining a partial area of the movable object, thereby determining the partial area of each frame picture. Thus, the content of the partial area of each frame picture can generate dynamic picture to display. In this way, it greatly improves user operability and experience.

DETAILED DESCRIPTION

The following, with reference to the accompanying drawings in embodiments of the present disclosure, the technical solutions in embodiments of the present disclosure will be described clearly and completely.

It should be noted that the specific embodiments described herein are only used to explain the present disclosure and are not intended to limit the present disclosure.

The partial image processing device according to embodiments of the present disclosure can be applied to a terminal. The mobile terminal according to embodiments of the present disclosure will now be described with reference to the accompanying drawings. In the following description, usage of suffixes such as 'module', 'part' or 'unit' used for referring to elements is given merely to facilitate explanation of the present application, without having any significant meaning by itself. Accordingly, the 'module' and 'part' may be mixedly used.

Mobile terminals may be implemented in various forms. For example, the terminal described in the present application may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present disclosure can be also applicable to the fixed types of terminals, except for any elements especially configured for a mobile purpose.

Figure 1:
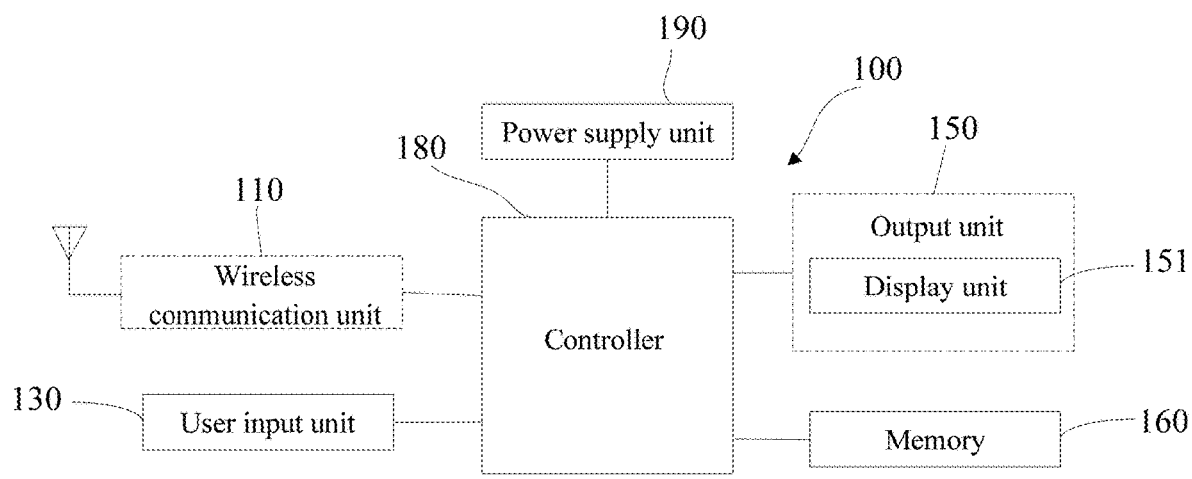
FIG. 1 is a schematic diagram of an optional hardware structure of a mobile terminal for implementing various embodiments of the present disclosure.

FIG. 1 is a block diagram of a mobile terminal according to an embodiment of the present disclosure.

The mobile terminal 100 may include a wireless communication unit 110, a user input unit 130, an output unit 150, a memory 160, a controller 180, a power supply unit 190 and the like. FIG. 1 shows the mobile terminal as having various components, but it should be noted that implementing all of the illustrated components is not a requirement. More or fewer components may alternatively be implemented.

The wireless communication unit 110 typically includes one or more components allowing radio communication between the mobile terminal 100 and a wireless communication system or a network in which the mobile terminal is located.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The output unit 150 may include the display unit 151, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its desired embodiment. For example, the mobile terminal may include both an external display unit and an internal display unit. The touch screen may be configured to detect even a touch input pressure as well as a touch input position and a touch input area.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

The mobile terminal 100 as shown in FIG. 1 may be configured to operate with a communication system, which transmits data via frames or packets, such as wired and wireless communication systems, as well as satellite-based communication systems.

Such communication systems in which the mobile terminal according to an embodiment of the present invention can operate will now be described with reference to FIG. 2.

These communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 2:
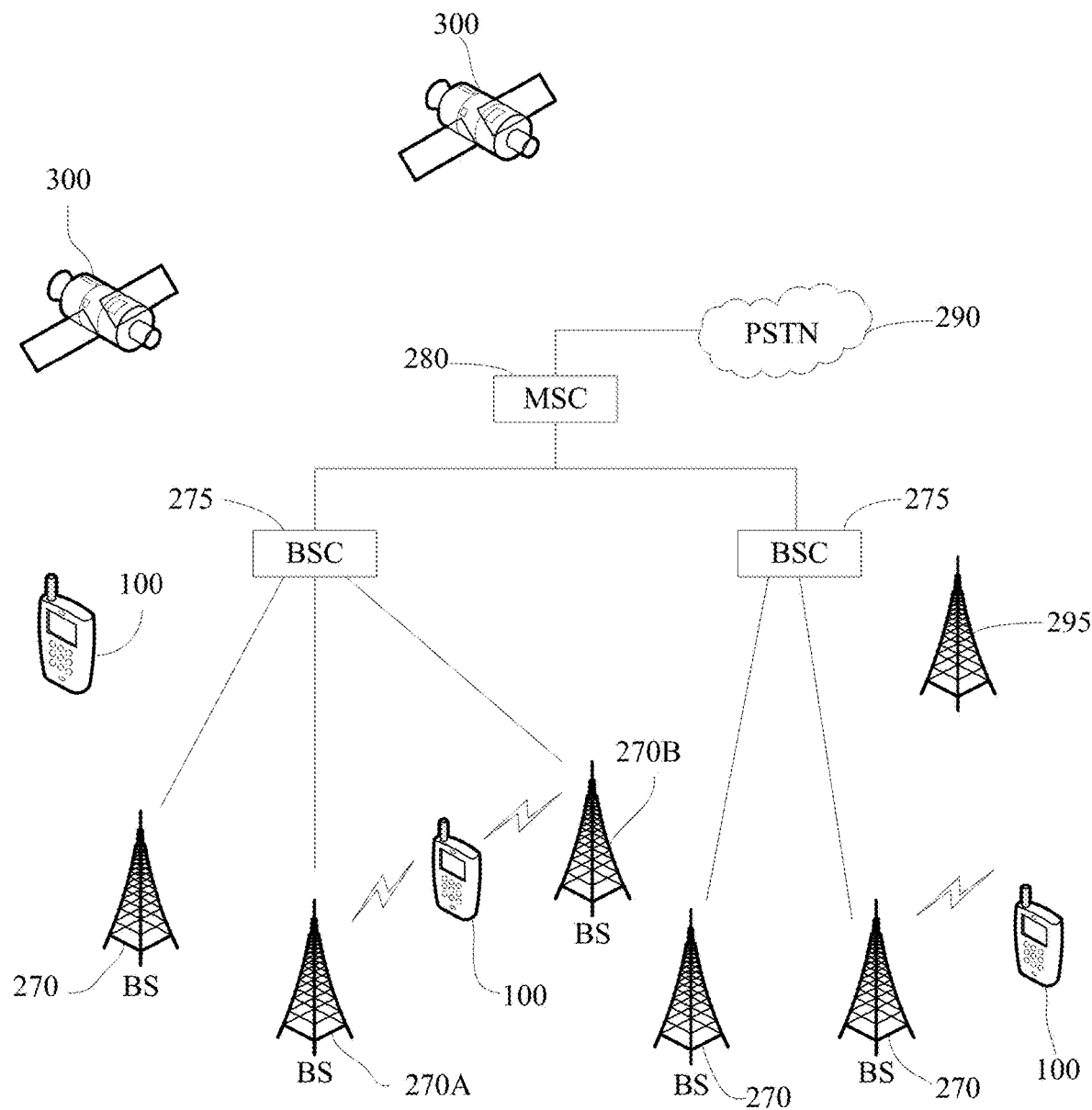
FIG. 2 is a schematic diagram of a wireless communication system of the mobile terminal shown in FIG. 1.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In this situation, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 2, several global positioning systems (GPS) satellites 300 are shown. The satellites 300 help locate at least one of a plurality of terminals 100.

In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Based on the hardware structure of mobile terminal and the camera lens, various embodiments of the method of the present disclosure are proposed.

Embodiment One

Figure 3:
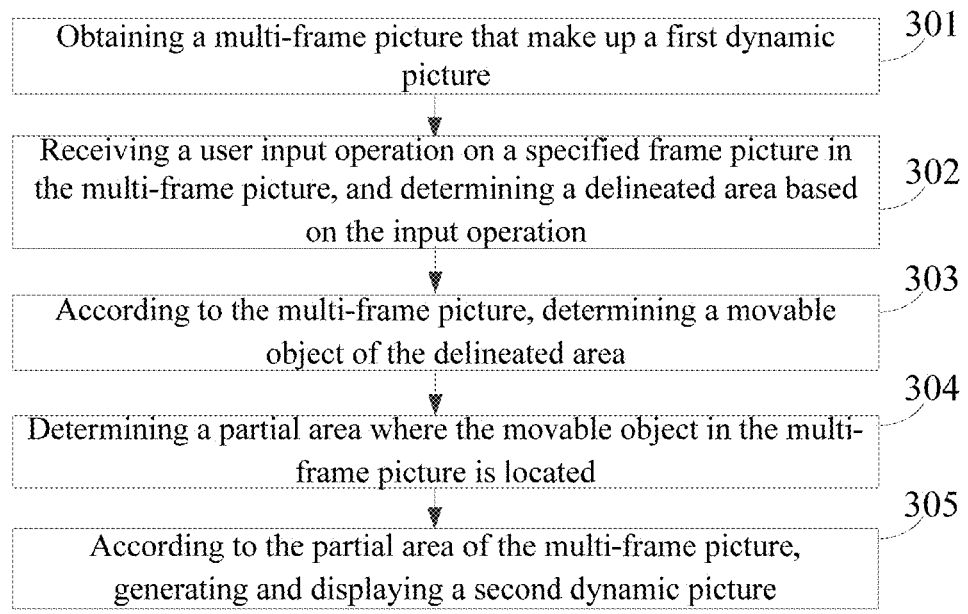
FIG. 3 is a flowchart of a partial image processing method according to embodiments of the present disclosure.
Figure 4:
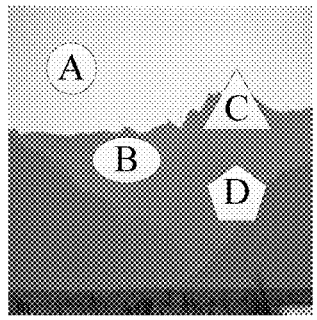
FIG. 4 is a schematic diagram of a first frame picture according to embodiments of the present disclosure.
Figure 5:
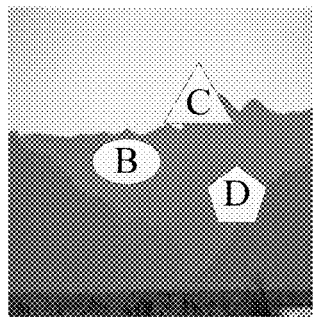
FIG. 5 is schematic diagram of a second frame picture according to embodiments of the present disclosure.
Figure 6:
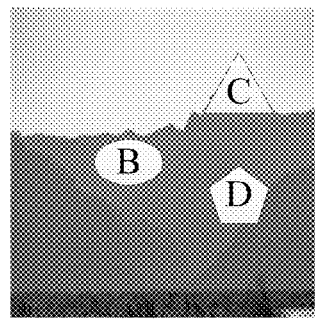
FIG. 6 is a schematic diagram of a third frame picture according to embodiments of the present disclosure.
Figure 7:
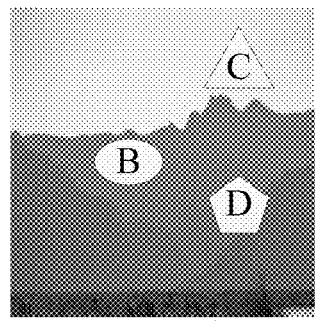
FIG. 7 is a schematic diagram of a fourth frame picture according to embodiments of the present disclosure.
Figure 8:
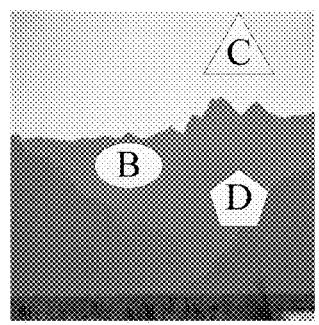
FIG. 8 is a schematic diagram of a fifth frame picture according to embodiments of the present disclosure.

Embodiments of the present disclosure provide a partial image processing method, applied to a partial image processing device, the device comprising a touch screen, and a CPU, as shown in FIG. 3, the method includes the followings.

Step S301, obtaining a multi-frame picture that make up a first dynamic picture.

Here, embodiments of the present disclosure are applicable to a dynamic picture composed of multiple frames. As an implementation method, the type of the first dynamic picture is GIF.

Step S302, receiving a user input operation on a specified frame picture in the multi-frame picture, and determining a delineated area based on the input operation.

Here, the partial image processing device that applies the partial image processing method can display the multi-frame picture that constitutes the first dynamic picture. User delineates a delineated area on a specified frame picture in the multi-frame picture, that is, the partial image processing device can receive an input operation for the specified frame picture, and determine a delineated area based on the input operation. Wherein, the specified frame picture may be any frame picture that constitutes the first dynamic picture, and also be a preset frame picture. For example, the specified frame picture may be the first frame picture that constitutes the first dynamic picture. The delineated area must be a closed area, the shape and size of this area is not limited in embodiments of the present disclosure.

Specifically, receiving the user input operation for the specified frame picture displayed on a touch screen, and according to the input operation, mapping an operation trajectory to the delineated area corresponding to the specified frame picture. User merely delineates an area on the screen, after the partial image processing device receives the delineated area, it maps the coordinate range of the area to the corresponding coordinate range on the specified frame picture, thereby determining the delineated area of the specified frame.

Step S303, according to the multi-frame picture, determining a movable object of the delineated area.

Specifically, identifying multiple objects of the delineated area, and obtaining a first feature of the multiple objects; obtaining a second feature of the multiple objects in other frame pictures except the specified frame picture; matching the first feature and the second feature of any object in the multiple objects, and obtaining a matching first object; obtaining a location information of the first object in the multi-frame picture; and taking the first object with a different location information as the movable object. Here, other frame pictures except the specified frame picture are pictures that make up the first dynamic picture.

Here, the identification and the acquisition of feature of the object in the delineated area of the picture generally includes the following steps: image preprocessing, feature extraction.

Among them, in order to reduce the complexity of subsequent algorithms and improve efficiency, image preprocessing is essential. The image preprocessing includes: background subtraction, image enhancement processing, image binarization processing, and image thinning processing. Wherein, background subtraction separates the object from the background, the object can be a foreground, thereby avoiding feature extraction in the area that has no valid information, accelerating the speed of subsequent processing, and improving the accuracy of feature extraction and matching of the object. The purpose of image enhancement is to improve image quality and restore its original structure. Image binarization refers to the conversion of an image from a grayscale image to a binary image. Image thinning translates a clear but non-uniform binary image into a dot-line image which the line width is only one pixel. Feature extraction is responsible for expressing the features that can fully represent the uniqueness of the object in the numerical form.

Specifically, matching the first feature and the second feature of any object in the multiple objects includes the followings: based on the above image preprocessing and feature extraction, the features of each object in the delineated area are compared with the features of each object in the other frame pictures except the specified frame picture, through the degree of similarity between them, the similarity parameter is obtained, and determining whether the objects in different frame images are consistent based on the similarity parameter. Specifically, obtaining the object whose the similarity parameter reach a preset threshold as the object with the same feature.

Further, after obtaining a location information of the first object in the multi-frame picture include the followings: obtaining a total number of the first object with the different location information; when the total number of the first object is greater than or equal to a predetermined multiple of picture frames that make up the first dynamic picture, taking the first object as the movable object. As an implementation method, the predetermined multiple may be 0.5.

The object same as the delineated area and similar to the delineated area is searched, because the object searched is dynamic, the location information of the object (that is, location) must be changed, and other objects that do not meet the requirements must be discarded. For example, there are 5 frame pictures in total, as shown in FIG. 4 to FIG. 8, in the delineated area of the first frame in FIG. 4, four objects of ABCD are found, in FIG. 5 to FIG. 8, the object A does not reappear and is discarded. In FIG. 5 to FIG. 8, the object B appears, but belongs to static object because of the same location, and it is discarded. Because the object C appears in FIG. 5 to FIG. 8 and its location has changed, so it can be saved as a movable object. The object D is found in the two pictures in FIG. 5 to FIG. 8 and is not typical movable objects. Therefore, the object D is also discarded. As can be seen from the above example, the principle of selecting the movable objects is: the typical dynamic object that exists in the multi-frame picture (50% of the preferred number of frames). Here, when the movable object of the multi-frame pictures plays continuously, the object seen by the naked eye is a dynamic object.

Step S304, determining a partial area where the movable object in the multi-frame picture is located.

Specifically, in other frame pictures except the specified frame picture, obtaining other movable objects that have the same features as the movable object and are different location information from the movable object, obtaining an outline of the movable object and the other movable objects, and taking an area enclosed by the outline of the movable object and the other movable objects as the partial area of corresponding frame picture.

Here, the outline of the movable object and the other movable objects can be obtained through an edge detection method. The essence of the edge detection is to use an algorithm to extract the boundary between the object and the background in the image. The edge is defined as the area boundary where the gray level changes drastically in the image. The change of the image grayscale can be reflected by the gradient of the image grayscale distribution, thus the edge detection operator can be obtained by the partial image differential technology. The classical edge detection method achieves the purpose of detecting the edge by constructing the edge detection operator on a small neighborhood of the pixel in the original image. Existing edge detection operator includes Roberts Cross operator, Prewitt operator, Sobel operator, Kirsch operator, Compass operator, Marr-Hildreth, Canny operator, Laplacian operator, etc.

Step S305, according to the partial area of the multi-frame picture, generating and displaying a second dynamic picture.

In this embodiment, the second dynamic picture that includes only the partial area may be generated according to the partial area of each frame picture, or a partial area of each frame may be combined with any frame picture to generate the second dynamic picture that has a partial dynamic image.

Before step 302, the method also includes: obtaining each object of the delineated area; when a second object in the delineated area is an incomplete image, complementing the second object from the specified frame picture.

Similarly, the second object of the specified frame picture and the second object of the delineated area can be detected by using the edge detection method. Wherein, the second object is any object in the delineated area; when the outline of the second object of the specified frame picture is larger than the outline of the second object of the delineated area, the second object of the specified frame picture is taken as the first outline of the delineated area.

Thus, according to a delineated area of a specified frame picture and each frame picture, determining a movable object of the delineated area; and determining a partial area of the movable object, thereby determining the partial area of each frame picture. Thus, the content of the partial area of each frame picture can generate dynamic picture to display. In this way, it greatly improves user operability and experience.

Embodiment Two

Figure 9:
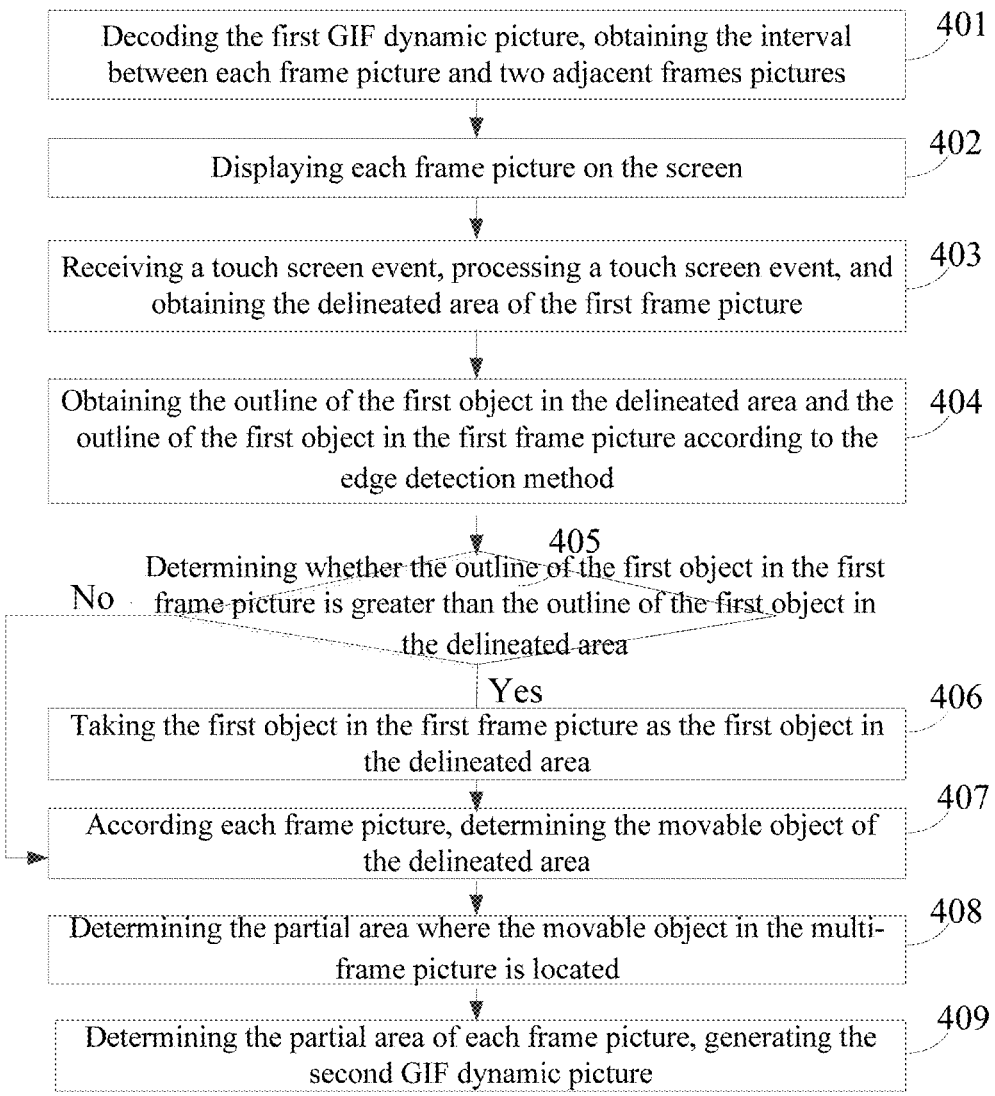
FIG. 9 is a flowchart of another partial image processing method according to embodiments of the present disclosure.

Embodiments of the present disclosure provide a partial image processing method, applied to smart phone, the smart phone comprising a touch screen, the dynamic picture in embodiments of the present disclosure uses the GIF dynamic picture as an example, as shown in FIG. 9, the method includes the followings.

Step S401, decoding the first GIF dynamic picture, obtaining the interval between each frame picture and two adjacent frames pictures.

Here, because the first GIF dynamic picture is a standard format file, and it is also a common practice that decode the first GIF dynamic picture. This embodiment is not described in detail. Assume that the first GIF dynamic picture has a total of 6 frame pictures.

Step S402, displaying each frame picture on the screen.

Here, according to the sequence of pictures obtained after decoding, the picture is drawn on the screen frame by frame.

Step S403, receiving a touch screen event, processing a touch screen event, and obtaining the delineated area of the first frame picture.

Here, the touch screen event may be user makes a circle on the screen when user presses the pause.

Step S404, obtaining the outline of the first object in the delineated area and the outline of the first object in the first frame picture according to the edge detection method.

Step S405, determining whether the outline of the first object in the first frame picture is greater than the outline of the first object in the delineated area. If yes, go to step 406; if not, go to step 407.

Here, the outline of the first object in the first frame picture is the complete outline of the image, and the outline of the first object in the delineated area may be the internal outline of the delineated area, after the delineated area truncates a complete object.

Step S406, taking the first object in the first frame picture as the first object in the delineated area.

Step S407, according each frame picture, determining the movable object of the delineated area.

Specifically, obtaining the feature of each object in the delineated area; obtaining the features of each object in other 5 frame pictures except the first frame; matching the feature of each object in the delineated area with other 5 frame pictures, obtaining the object with the same features; and obtaining the location information of the objects with the same features in each frame picture; obtaining the total number of the object with different location information and the same features; when the total number of the first object is greater than or equal to 3, the first object is available as the movable image. Here, there may be not only one movable image but also a plurality of movable images, which is not limited in this embodiment.

It is worth noting that since the dynamic picture needs to be a coherent picture, thus, if the delineated area divides an object, then the complete object of the object will be the object of the delineated area.

Step S408, determining the partial area where the movable object in the multi-frame picture is located.

In other 5 frame pictures, obtaining other movable objects that have the same features as the movable object and are different location information from the movable object; obtaining an outline of the movable object and the other movable objects; and taking an area enclosed by the outline of the movable object and the other movable objects as the partial area of corresponding frame picture. Here, other movable objects are the objects that correspond to the movable object.

Step S409, determining the partial area of each frame picture, generating the second GIF dynamic picture.

In this way, the dynamic image can be recognized intelligently, the problem of positional inconsistency and the dynamic image is not well-determined can be solved, and user experience is increased.

Embodiment Three

Figure 10:
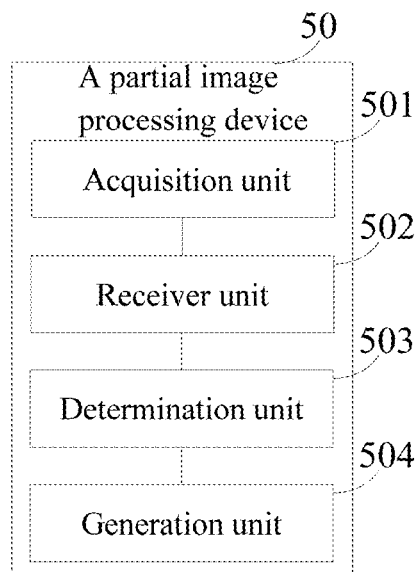
FIG. 10 is a structural diagram of a partial image processing device according to embodiments of the present disclosure.

Embodiments of the present disclosure provide a partial image processing device 50, as shown in FIG. 10, the device 50 includes:

An acquisition unit 501 is configured to obtain a multi-frame picture that make up a first dynamic picture;

A receiver unit 502 is configured to receive a user input operation on a specified frame picture in the multi-frame picture, and determine a delineated area based on the input operation;

A determination unit 503 is configured to, according to the multi-frame picture, determine a movable object of the delineated area, and determine a partial area where the movable object in the multi-frame picture is located; and A generation unit 504 is configured to, according to the partial area of the multi-frame picture, generate and display a second dynamic picture.

Thus, according to a delineated area of a specified frame picture and each frame picture, determining a movable object of the delineated area; and determining a partial area of the movable object, thereby determining the partial area of each frame picture. Thus, the content of the partial area of each frame picture can generate dynamic picture to display. In this way, it greatly improves user operability and experience.

Specifically, the receiver unit 502 is configured to receive the user input operation for the specified frame picture displayed on a touch screen, and according to the input operation, map an operation trajectory to the delineated area corresponding to the specified frame picture.

Specifically, the generation unit 504 is configured to, according to the partial area of the multi-frame picture, generate the second dynamic picture that includes only the partial area, and display the second dynamic picture; or combine any frame picture with the partial area of each frame picture, generate the second dynamic picture that has a partial dynamic image, and display the second dynamic picture.

As an implementation method, the determination unit 503 is configured to: identify multiple objects of the delineated area, and obtain a first feature of the multiple objects; obtain a second feature of the multiple objects in other frame pictures except the specified frame picture; match the first feature and the second feature of any object in the multiple objects, and obtain a matching first object; obtain a location information of the first object in the multi-frame picture; and take the first object with a different location information as the movable object.

Figure 11:
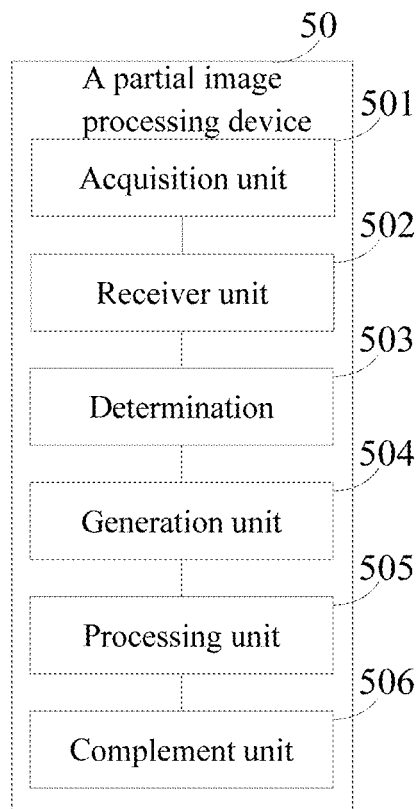
FIG. 11 is a structural diagram of another partial image processing device according to embodiments of the present disclosure.

As an implementation method, the acquisition unit 501 is configured to, after obtain a location information of the first object in the multi-frame picture, obtain a total number of the first object with the different location information;

As shown in FIG. 11, the device 50 also includes: a processing unit 505 is configured to, when the total number of the first object is greater than or equal to a predetermined multiple of picture frames that make up the first dynamic picture, take the first object as the movable object.

Specifically, the determination unit 503 is configured to compare the first feature of each object in the delineated area with the second feature of a corresponding object in the other frame pictures except the specified frame picture, obtain a similarity parameter; and obtain the object whose the similarity parameter reach a preset threshold as the matching first object.

As an implementation method, the determination unit 503 is also configured to: in other frame pictures except the specified frame picture, obtain other movable objects that have the same features as the movable object and are different location information from the movable object; obtain an outline of the movable object and the other movable objects; and take an area enclosed by the outline of the movable object and the other movable objects as the partial area of corresponding frame picture.

Specifically, the determination unit 503 is configured to obtain the outline of the movable object and the other movable objects through an edge detection method.

As an implementation method, the acquisition unit 501 is configured to obtain each object of the delineated area.

As shown in FIG. 11, the device 50 also includes: a complement unit 506 is configured to, when a second object in the delineated area is an incomplete image, complement the second object from the specified frame picture.

Embodiment Four

Figure 12:
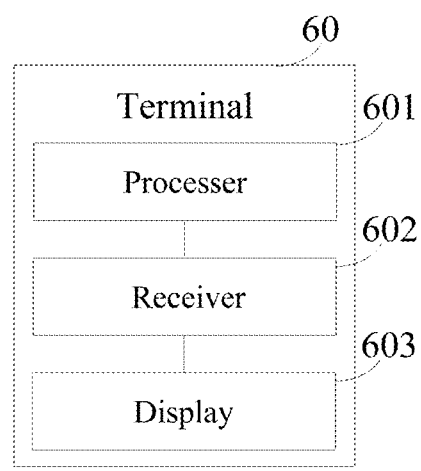
FIG. 12 is a structural diagram of another partial image processing device according to embodiments of the present disclosure.

Embodiments of the present disclosure provide a partial image processing device 60, as shown in FIG. 12, the device 60 includes:

A processor 601 is configured to obtain a multi-frame picture that make up a first dynamic picture;

A receiver 602 is configured to receive a user input operation on a specified frame picture in the multi-frame picture The processor 601 is also configured to, according to the input operation received by the receiver 602, determine a delineated area; according to the multi-frame picture, determine a movable object of the delineated area; determining a partial area where the movable object in the multi-frame picture is located; according to the partial area of the multi-frame picture, generate and display a second dynamic picture.

A display 603 is configured to display the second dynamic picture.

Thus, according to a delineated area of a specified frame picture and each frame picture, determining a movable object of the delineated area; and determining a partial area of the movable object, thereby determining the partial area of each frame picture. Thus, the content of the partial area of each frame picture can generate dynamic picture to display. In this way, it greatly improves user operability and experience.

As an implementation method, the processor 601 is configured to identify multiple objects of the delineated area, and obtain a first feature of the multiple objects; obtain a second feature of the multiple objects in other frame pictures except the specified frame picture; match the first feature and the second feature of any object in the multiple objects, and obtain a matching first object; obtain a location information of the first object in the multi-frame picture; and take the first object with a different location information as the movable object.

As an implementation method, the processor 601 is configured to obtain a total number of the first object with the different location information; and when the total number of the first object is greater than or equal to a predetermined multiple of picture frames that make up the first dynamic picture, take the first object as the movable object.

As an implementation method, the processer 601 is configured to, in other frame pictures except the specified frame picture, obtain other movable objects that have the same features as the movable object and are different location information from the movable object; obtain an outline of the movable object and the other movable objects; and take an area enclosed by the outline of the movable object and the other movable objects as the partial area of corresponding frame picture.

As an implementation method, the processer 601 is configured to obtain each object of the delineated area; and when a second object in the delineated area is an incomplete image, complement the second object from the specified frame picture.

It should be understood for persons of ordinary skill in the art that embodiments of the present disclosure may be provided as a method, system, or computer program product. Thus, the present disclosure may take the form of a hardware embodiment, a software embodiment, or the embodiment combining software and hardware aspects. Moreover, the present disclosure may take the form of computer program product embodied on one or more computer-usable storage media (including but not limited to disk storage, optical storage, etc.) having computer-usable program code therein.

The present disclosure is described according to the flowcharts and/or block diagrams of methods, devices (systems), and computer program products of embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device, it makes the device used to implement the specified functions in one or more blocks of a flowchart or multiple flows and/or block diagrams of a flowchart can be generated by instructions executed by a processor of a computer or other programmable data processing device.

The computer program instructions may also be stored in a computer-readable storage device that can conduct a computer or other programmable data processing device to operate in a specific manner, it makes instructions stored in the computer-readable storage device to produce manufactures that include the command device. The instruction device implements the specified functions in one or more blocks of one or more processes and/or block diagrams of the flowchart.

These computer program instructions can also be loaded onto a computer or other programmable data processing devices, it makes a series of operational steps to be performed on the computer or other programmable device in order to generate the processes of computer-implemented, thereby the instructions in a computer or other programmable devices provide the steps for implementing the specified functions in one or more blocks of a flowchart or a plurality of flowcharts and/or block diagrams of a flowchart.

The foregoing descriptions are merely specific embodiments of the present disclosure, but the protection scope of the present application is not limited thereto.

INDUSTRIAL PRACTICABILITY

Embodiments of the present disclosure can determine a movable object of the delineated area according to a delineated area of a specified frame picture; and determine a partial area of the movable object, thereby determining the partial area of each frame picture. Thus, the content of the partial area of each frame picture can generate dynamic picture to display. In this way, it greatly improves user operability and experience.

What is claimed is:

1. A partial image processing method, comprising:
    obtaining a multi-frame picture that makes up a that dynamic picture;
    receiving a user input operation on a specified frame picture in the multi-frame picture, and determining a delineated area based on the input operation;
    according to the multi-frame picture, determining a movable object of the delineated area;
    determining a partial area where the movable object in the multi-frame picture is located; and
    according to the partial area of the multi-frame picture, generating and displaying a different second multi-frame dynamic picture,
    wherein determining the movable object of the delineated area according to the multi-frame picture further includes:
        identifying multiple objects of the delineated area in the specified frame picture, and obtaining a first feature of the multiple objects;
        obtaining a second feature of the multiple objects in other frame pictures except the specified frame picture;
        matching the first feature and the second feature of any object in the multiple objects, and obtaining a matching first object;
        obtaining a location information of the first object in each frame picture of the multi-frame picture; and
        if the location information of the first object between each frame picture of the multi-frame picture is different, taking the first object as the movable object; and
    wherein before determining the movable object of the delineated area according to the multi-frame picture, the method further comprises;
        obtaining each object of the delineated area; and
        when a second object of the delineated area is an incomplete image, complementing the second object from the specified frame picture by taking the second object of the specified frame picture as a first outline of the delineated area, wherein the incomplete image of the second object includes a portion located within the delineated area but the second object is wholly located within the specified frame picture.

2. The method according to claim 1, wherein, after obtaining the location information of the first object in each frame picture of the multi-frame picture, the method further comprises:
    obtaining a total number of the first object with the different location information; and
    when the total number of the first object is greater than or equal to a predetermined multiple of picture frames that make up the first dynamic picture, taking the first object as the movable object.

3. The method according to claim 2, wherein determining the partial area where the movable object in the multi-frame picture is located further comprises:
    in other frame pictures except the specified frame picture, obtaining other movable objects that have the same features as the movable object and are different location information from the movable object;
    obtaining an outline of the movable object and the other movable objects; and
    taking an area enclosed by the outline of the movable object and the other movable objects as the partial area of corresponding frame picture.

4. The method according to claim 1, wherein the delineated area is a closed area.

5. The method according to claim 1, wherein receiving the user input operation on the specified frame picture in the multi-frame picture, and determining the delineated area based on the input operation further comprises:
    receiving the user input operation for the specified frame picture displayed on a touch screen, and according to the input operation, mapping an operation trajectory to the delineated area corresponding to the specified frame picture.

6. The method according to claim 1, wherein matching the first feature and the second feature of any object in the multiple objects, and obtaining the matching first object further comprises:
    comparing the first feature of each object in the delineated, area with the second feature of a corresponding object in the other frame pictures except the specified frame picture, obtaining a similarity parameter; and
    obtaining an object whose the similarity parameter reach a preset threshold as the matching first object.

7. The method according to claim 3, wherein obtaining an outline of the movable object and the other movable objects further comprises:
    obtaining the outline of the movable object and the other movable objects through an edge detection method.

8. The method according to claim 1, wherein, according to the partial area of the multi-frame picture, generating and displaying the different second dynamic picture further comprises;
    according to the partial area of the multi-frame picture, generating the second dynamic picture that includes only the partial area, al d displaying the second dynamic picture; or combining any frame picture with the partial area of each frame picture, generating the second dynamic picture that has a partial dynamic image, and displaying the second dynamic picture.

9. A partial image processing device, comprising:
an acquisition unit configured to obtain a multi-frame picture that make up a first dynamic picture;
a receiver unit configured to receive a user input operation on a specified frame picture in the multi-frame picture, and determine a delineated area based on the input operation;
a determination unit configured to, according to the multi-frame picture, determine a movable object of the delineated area, and determine a partial area where the movable object in the multi-frame picture is located; and
a generation unit configured to, according to the partial area of the mufti-frame picture, generate and display a different second multi-frame dynamic picture,
wherein to determine the movable object of the delineated area, the determination unit is further configured to:
identify multiple objects of the delineated area in the specified frame picture, and obtain a first feature of the multiple objects;
obtain a second feature of the multiple objects in other frame pictures except the specified frame picture;
match the first feature and the second feature of any object in the multiple objects, and obtain a matching first object;
obtain a location information of the first object in each frame picture of die multi-frame picture; and
if the location information of the first object between each frame picture of the multi-frame picture is different take the first object as the movable object; and
wherein the acquisition unit is further configured to obtain each object of the delineated area, and the device further includes:
a complement unit configured to, when a second object of the delineated area is an incomplete image, complement the second object from the specified frame picture by taking the second object of the specified frame picture as a first outline of the delineated area, wherein the incomplete image of the second object includes a portion locate within the delineated area but the second object is wholly located within the specified frame picture.

10. The device according to claim 9, wherein the acquisition unit is configured to, after obtain the location information of the first object in each frame picture of the multi-frame picture, obtain the total number of the first object with the different location information;
the device includes:
a processing unit configured to, when the total number of the first object is greater than or equal to a predetermined multiple of picture frames that make up the first dynamic picture, take the first object as the movable object.

11. The device according to claim 10, wherein the acquisition unit is configured to:
in other frame pictures except the specified frame picture, obtain other movable objects that have the same features as the movable object and are different location information from the movable object;
obtain an outline of the movable object and the other movable objects; and
take an area enclosed by the outline of the movable object and the other movable objects as the partial area of corresponding frame picture.

12. The device according to claim 9, wherein the receiver unit is configured to receive the user input operation for the specified frame picture displayed on a touch screen, and according to the input operation, map an operation trajectory to the delineated area. corresponding to the specified frame picture.

13. The device according to claim 9, wherein the determination unit is configured to compare the first feature of each object in the delineated area with the second feature of a corresponding object in the other frame pictures except the specified frame picture, obtain a similarity parameter; and
obtain an object whose the similarity parameter reach a preset threshold as the matching first object.

14. The device according to claim 11, wherein the determination unit is configured to obtain the outline of the movable object and the other movable objects through an edge detection method.

15. The device according to claim 9, wherein the generation unit is configured to, according to the partial area of the multi-frame picture, generate the second dynamic picture that includes only the partial area, and display the second dynamic picture; or
combine any frame picture with the partial area of each frame picture, generate the second dynamic picture that has a partial dynamic image, and display the second dynamic picture.

16. A non-transitory tangible computer storage medium, wherein the computer storage medium stores computer executable instructions, the executable instructions are configured to perform the partial image processing method of claim 1.

* * * * *